(12) United States Patent
Akikusa et al.

(10) Patent No.: US 7,910,262 B2
(45) Date of Patent: Mar. 22, 2011

(54) SOLID ELECTROLYTE TYPE FUEL CELL AND AIR ELECTRODE CURRENT COLLECTOR USED FOR THE SAME

(75) Inventors: Jun Akikusa, Chiyoda-ku (JP); Koji Hoshino, Chiyoda-ku (JP)

(73) Assignee: Mitsubishi Materials Corporation, Tokyo (JP)

( * ) Notice: Subject to any disclaimer, the term of this patent is extended or adjusted under 35 U.S.C. 154(b) by 688 days.

(21) Appl. No.: 11/889,732

(22) Filed: Aug. 16, 2007

(65) Prior Publication Data

US 2008/0003477 A1    Jan. 3, 2008

Related U.S. Application Data

(62) Division of application No. 10/416,454, filed as application No. PCT/JP01/09986 on Nov. 15, 2001, now Pat. No. 7,273,673.

(30) Foreign Application Priority Data

| Nov. 16, 2000 | (JP) | 2000-349435 |
| Dec. 6, 2000 | (JP) | 2000-371941 |
| Jan. 9, 2001 | (JP) | 2001-001388 |
| Sep. 28, 2001 | (JP) | 2001-303058 |
| Nov. 7, 2001 | (JP) | 2001-341529 |

(51) Int. Cl.
*H01M 8/10* (2006.01)
*H01M 4/64* (2006.01)

(52) U.S. Cl. ............ 429/522; 429/479; 429/491
(58) Field of Classification Search ............ 429/479, 429/491, 522
See application file for complete search history.

(56) References Cited

U.S. PATENT DOCUMENTS

| 4,476,002 A | 10/1984 | Howard et al. |
| 5,676,808 A * | 10/1997 | Nishiki et al. ............. 204/252 |
| 6,423,194 B1 | 7/2002 | Furuya |

FOREIGN PATENT DOCUMENTS

| EP | 0 682 379 | 11/1995 |
| JP | 06-231777 | 8/1994 |
| JP | 08-046116 | 2/1996 |
| JP | 11-162478 | 6/1999 |
| JP | 2000-348753 | 12/2000 |
| WO | 99/13522 | 3/1999 |
| WO | 00/50668 | 8/2000 |

\* cited by examiner

*Primary Examiner* — Karie O'Neill Apicella
(74) *Attorney, Agent, or Firm* — Wenderoth, Lind & Ponack, L.L.P.

(57) ABSTRACT

A solid electrolyte type fuel cell which incorporates a metal separator comprising a base material of a metal other than silver or a silver alloy which is plated with silver or a silver alloy. The fuel cell can achieve improved efficiency for electricity generation with no increase of the resistance of the metal separator, even when it is operated at a low temperature.

2 Claims, 3 Drawing Sheets

SOLID ELECTROLYTE TYPE FUEL CELL AND AIR ELECTRODE CURRENT COLLECTOR USED FOR THE SAME

This application is a divisional of application Ser. No. 10/416,454 now U.S. Pat. No. 7,273,673, which is the National State of International Application No. PCT/JP01/09986, filed Nov. 15, 2001.

TECHNICAL FIELD

The present invention relates to a solid electrolyte type fuel cell including an electric power generation cell constituted by an electrolyte layer sandwiched between a fuel electrode layer and an air electrode layer, and having high output density even when it is operated at a low temperature, and particularly to an air electrode current collector used for such a low temperature operating solid electrolyte type fuel cell.

BACKGROUND OF THE INVENTION

In general, since a solid electrolyte type fuel cell can use hydrogen gas, natural gas, methanol, coal gas or the like as a fuel, it can promote the substitution of alternative energy for oil in electric power generation, and further, since waste heat can be used, it has attracted attention from the viewpoint of resource savings and an environmental problem.

This solid electrolyte type fuel cell has a laminated structure as shown in an exploded perspective view of FIG. 1 and a sectional schematic view of FIG. 2. That is, a solid electrolyte type fuel cell 10 includes an electric power generation cell 14 made up of a solid electrolyte layer 11, a fuel electrode layer 12 and an air electrode layer 13, which are disposed at both sides of this solid electrolyte layer 11, a fuel electrode current collector 16 disposed to be in close contact with the fuel electrode layer 12, an air electrode current collector 18 disposed to be in close contact with the air electrode layer 13, and metal separators 17 constructed so that a fuel gas can be supplied to the fuel electrode layer 12 and an oxidizing agent gas containing oxygen can be supplied to the air electrode layer 13. Reference numerals 20 and 21 in FIG. 2 denote grooves which become a fuel passage and an air passage, respectively.

The conventional solid electrolyte type fuel cell is operated at a high temperature of 1000° C., so that chemical energy of fuel can be relatively efficiently converted into electric energy, however, in order to operate the solid electrolyte type fuel cell at 1000° C., materials used for component parts of the solid electrolyte type fuel cell are restricted especially to materials superior in heat resistance. For example, as a structure material of the separator or the like, it has been necessary to use dense ceramics such as lanthanum chromite ($LaCrO_3$). Further, an attached apparatus (for example, a preheating apparatus of fuel gas, or the like) for operating the solid electrolyte type fuel cell is also required to be made of a material resistant to high temperature, and because of the operation at a high temperature, the consumption of the material becomes quick, the use life becomes short, and it is inevitable that the cost becomes high. Thus, in recent years, a solid electrolyte type fuel cell which can be efficiently operated at a temperature lower than 1000° C. and in which metal material can be used for peripheral members, has been developed.

In such a low temperature operating solid electrolyte type fuel cell, lanthanum gallate oxide, Sc-added zirconium, Y-added zirconium, ceria base oxide or the like is used for a solid electrolyte layer. By using these materials, the operation temperature can be lowered to about 700° C., and a metal material can be used for a peripheral member such as a separator. As a metal separator material, stainless steel, nickel base heat resistant alloy, cobalt base alloy or the like is used.

Besides, an air electrode current collector material is one of a plurality of important members influencing the power generation performance of a fuel cell, and mesh-shaped platinum is conventionally used as the air electrode current collector material.

However, the surface of the conventional metal separator material is covered with a chromium oxide film under conditions of, for example, 700° C. in the air, and the chromium oxide has conductivity at a high temperature, and has such a property that when temperature is lowered, its electric resistance increases. Accordingly, in the case where the operation is performed at a low temperature of about 700° C., it has a defect that the electric resistance is too large to be used as a separator material. Thus, even in the case where the fuel cell is operated at a low temperature while metal material is used for the separator, a material having a smaller electric resistance has been required.

Besides, in the case where a platinum mesh is used as an air electrode current collector, platinum is expensive since it is a noble metal, and for reduction in cost, a high performance air electrode current collector material substituting for platinum has been desired.

SUMMARY OF THE INVENTION

An object of the present invention is to provide an electrode current collector used in a solid electrolyte type fuel cell, which is inexpensive as compared with a conventional air electrode current collector made of a platinum mesh, and can achieve excellent electric power generation efficiency even in a case where it is operated at a low temperature.

Further, an object of the invention is to provide a relatively inexpensively solid electrolyte type fuel cell in which electric resistance of a metal separator is not increased even in a case where it is operated at a low temperature, and electric power generation efficiency can be improved.

That is, a first aspect of the invention is an air electrode current collector characterized by comprising a silver porous body.

The second aspect of the invention is an air electrode current collector used for a solid electrolyte type fuel cell, characterized by comprising a silver porous body having a surface on which an oxide film is formed.

The third aspect of the invention is an air electrode current collector used for a solid electrolyte type fuel cell, characterized by comprising a dispersion strengthened silver porous body in which an oxide is dispersed in a silver base metal.

The fourth aspect of the invention is an air electrode current collector used for a solid electrolyte type fuel cell, characterized by comprising a silver alloy porous body having a melting point of 600° C. or higher.

The fifth aspect of the invention is, in the fourth aspect of the invention, an air electrode current collector in which the silver alloy having the melting point of 600° C. or higher is a silver alloy containing not more than 40% by mass of one of or at least two of Cu, Zn, Cd, Ni, Sn, Au, Pt, Pd, Ir and Rh in total and the remainder of Ag and an inevitable impurity.

The sixth aspect of the invention is, in the fourth aspect of the invention, an air electrode current collector in which the silver alloy having the melting point of 600° C. or higher is a dispersion strengthened silver porous body in which an oxide is dispersed in a silver alloy base metal containing not more than 40% by mass of one of or at least two of Cu, Zn, Cd, Ni, Sn, Au, Pt, Pd, Ir and Rh in total and the remainder of Ag and an inevitable impurity.

The seventh aspect of the invention is an air electrode current collector used for a solid electrolyte type fuel cell, characterized by comprising a porous body of metal or alloy having high temperature strength more superior than silver, in which a Ni plating under layer is formed on at least a side of the porous body in contact with an air electrode, and a silver plating is formed thereon.

The eighth aspect of the invention is, in the seventh aspect of the invention, an air electrode current collector in which the metal or the alloy having the high temperature strength more superior than the silver is Ni or Ni base alloy, Fe or Fe alloy, or Co or Co alloy.

The ninth aspect of the invention is, in any of the first to eighth aspects of the invention, an air electrode current collector in which the porous body is a sponge metal porous body having a three-dimensional skeletal structure.

The tenth aspect of the invention is, in any of the first to ninth aspects of the invention, an air electrode current collector in which the porous body is reinforced by a mesh metal body.

The eleventh aspect of the invention is, in the tenth aspect of the invention, an air electrode current collector in which the mesh metal body is made of silver or silver alloy, or is made of a metal matrix which is other than silver or silver alloy and is coated with silver or silver alloy.

The twelfth aspect of the invention is, in the eleventh aspect of the invention, an air electrode current collector in which the mesh metal body is the metal matrix other than the silver or the silver alloy, the metal matrix is plated with nickel and is plated with silver while the nickel plating is used as an under layer.

The thirteenth aspect of the invention is an air electrode current collector used for a solid electrolyte type fuel cell, characterized by comprising a silver felt made of a silver fiber.

The fourteenth aspect of the invention is an air electrode current collector used for a solid electrolyte type fuel cell, characterized by comprising a silver mesh made of a silver thin wire.

The fifteenth aspect of the invention is an air electrode current collector used for a solid electrolyte type fuel cell, characterized by comprising a silver plated felt made of a silver plated fiber in which a surface of a metal fiber made of metal or alloy having high temperature strength more superior than silver is plated with silver.

The sixteenth aspect of the invention is an air electrode current collector used for a solid electrolyte type fuel cell, characterized by comprising a silver plated mesh obtained by giving silver plating to a metal mesh made of a metal thin wire of metal or alloy having high temperature strength more superior than silver.

The seventeenth aspect of the invention is, in the fifteenth or sixteenth aspects of the invention, an air electrode current collector in which the metal or the alloy having the high temperature strength more superior than the silver is Ni or Ni base alloy, Fe or Fe base alloy, or Co or Co base alloy.

The eighteenth aspect of the invention is a solid electrolyte type fuel cell comprising an air electrode current collector of any one of the first to seventeenth aspects of the invention.

According to the air electrode current collector of the first to seventeenth aspects of the invention, as compared with the conventional air electrode current collector made of the platinum mesh, since the low cost material can be used, the manufacture cost can be reduced. Besides, according to the solid electrolyte type fuel cell comprising the air electrode current collector of the first to seventeenth aspects of the invention, as compared with the conventional solid electrolyte type fuel cell comprising the air electrode current collector made of the platinum mesh, the electric power generation efficiency can be improved by a factor of 1.6 or more, and excellent electric power generation characteristics can be exhibited even in a case where the operation is performed at a temperature lowered to 900° C. or lower.

Further, the nineteenth aspect of the invention is, as shown in FIGS. 1 and 2, a solid electrolyte type fuel cell comprising an electric power generation cell 14 made up of a solid electrolyte layer 11, a fuel electrode layer 12 and an air electrode layer 13, which are disposed at both sides of this solid electrolyte layer 11, a fuel electrode current collector 16 disposed to be in close contact with the fuel electrode layer, an air electrode current collector 18 disposed to be in close contact with the air electrode layer, and metal separators 17 constructed so that a fuel gas can be supplied to the fuel electrode layer and an oxidizing agent gas containing oxygen can be supplied to the air electrode layer, wherein the solid electrolyte type fuel cell is characterized in that the metal separators 17 are plated with one of silver and silver alloy. The metal separators are plated with one of silver and silver alloy, so that the electric resistances of the respective metal separators 17 can be remarkably decreased for a long time.

The twentieth aspect of the invention is, in the nineteenth aspect of the invention, a fuel cell in which the metal separators 17 are made of stainless steel, nickel base heat resistant alloy or cobalt base alloy. The stainless steel, the nickel base heat resistant alloy, or the cobalt base alloy is used for the metal separators, so that excellent heat resistance is exhibited.

The twenty-first aspect of the invention is, in the twentieth aspect of the invention, a fuel cell in which the stainless steel is ferrite stainless steel. Since the ferrite stainless steel is excellent in adhesion to silver, it is preferable as a metal matrix.

The twenty-second aspect of the invention is, in any one of the nineteenth to twenty-first aspects of the invention, a fuel cell in which the metal separators 17 are plated with nickel, and are plated with one of silver and silver alloy while the nickel plating is used as an under layer. The under plating with nickel is performed, so that high adhesion between the metal separator and the silver or sliver alloy plating can be obtained.

The twenty-third aspect of the invention is, in the nineteenth aspect of the invention, a fuel cell in which the air electrode current collector 18 is a porous body made of silver or silver alloy, or a porous body in which a porous body of a metal other than silver or silver alloy is coated with silver. Silver has properties that it is reduced even in a high temperature oxidizing atmosphere of 200° C. or higher, a solid metal phase is a stable phase, oxygen is slightly dissolved therein, and oxygen easily diffuses in the inside. On the other hand, the conventionally used platinum hardly dissolves oxygen. Thus, the performance is improved by using silver as the material of the air electrode current collector.

The twenty-fourth aspect of the invention is a fuel cell in which the air electrode current collector 18 is the metal matrix other than the silver or the silver alloy, in which the metal matrix is plated with nickel, and is plated with silver while the nickel plating is used as an under layer. The under plating with nickel is performed, so that high adhesion between the metal matrix and silver can be obtained.

The twenty-fifth aspect of the invention is, in the twenty-third aspect of the invention, a fuel cell in which the porous body is a sponge metal porous body having a three-dimensional skeletal structure.

The twenty-sixth aspect of the invention is, in the twenty-third or twenty-fifth aspects of the invention, as shown in FIG. 3, a fuel cell in which the porous body 18a is reinforced by a mesh metal body 18b. The porous body 18a is brittle and there is also a case where it is easily crushed, and in this case, the shape of the air electrode current collector can be kept more firmly by performing the reinforcement with the mesh metal body 18b.

The twenty-seventh aspect of the invention is, in the twenty-sixth aspect of the invention, a fuel cell in which the mesh metal body 18b is made of silver or silver alloy, or is made of a metal matrix which is other than silver or silver alloy and is coated with silver or silver alloy. The cell performance can be stabilized by making the mesh metal body 18b out of the same material as the air electrode current collector.

The twenty-eighth aspect of the invention is, in the twenty-seventh aspect of the invention, a fuel cell in which the mesh metal body 18b is the metal matrix other than the silver or the silver alloy, the metal matrix is plated with nickel, and is plated with silver while the nickel plating is used as an under layer. The high adhesion between the metal matrix and the silver can be obtained by performing the under plating with nickel.

The twenty-ninth aspect of the invention is, in any of the nineteenth to twenty-eighth aspects of the invention, a fuel cell in which the solid electrolyte layer 11 is a conductor selected from a group consisting of lanthanum gallate solid oxide, Sc-stabilized zirconium, Y-stabilized zirconium, and ceria base oxide. When these conductors are used as the solid electrolyte layer 11, the fuel cell with the operation temperature of lower than 950° C. can be easily realized.

BEST MODE FOR CARRYING OUT THE INVENTION

Figure 1:
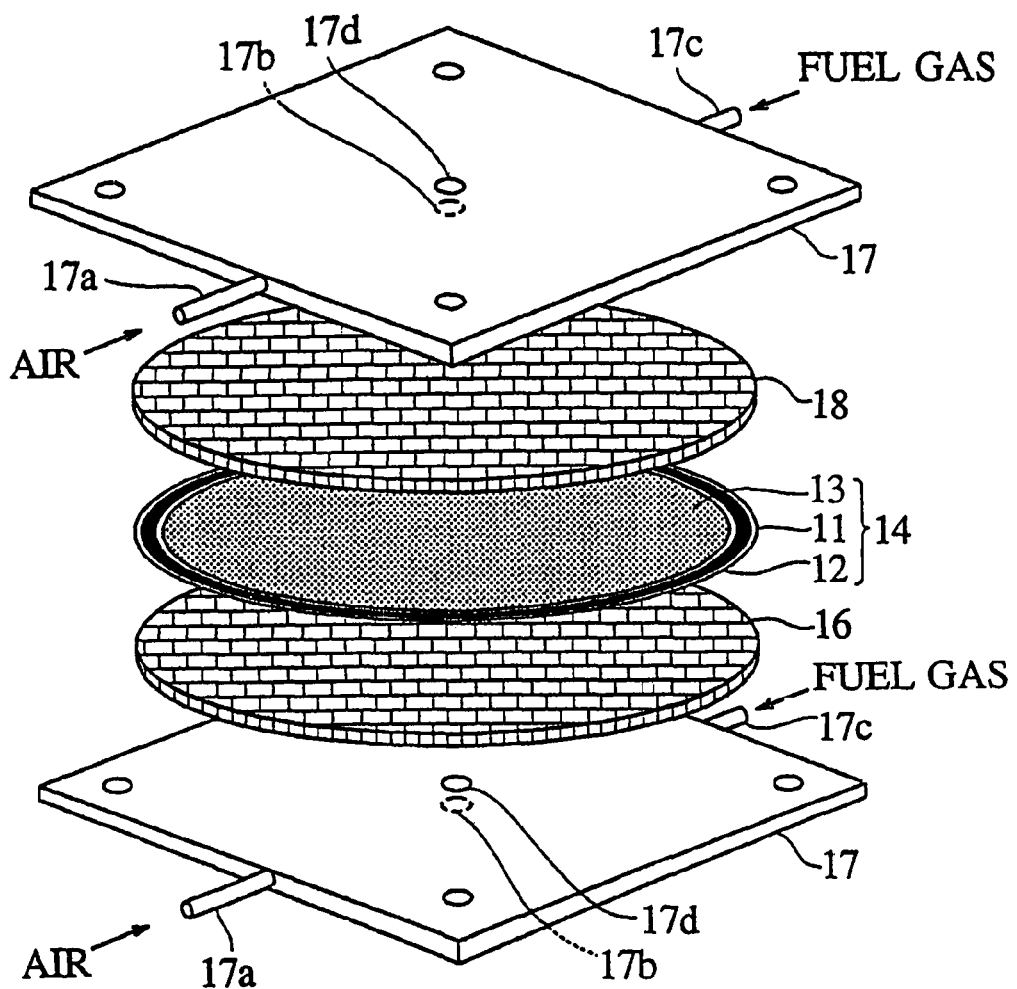
FIG. 1 is an exploded perspective view showing a basic structure of a solid electrolyte type fuel cell.
Figure 2:
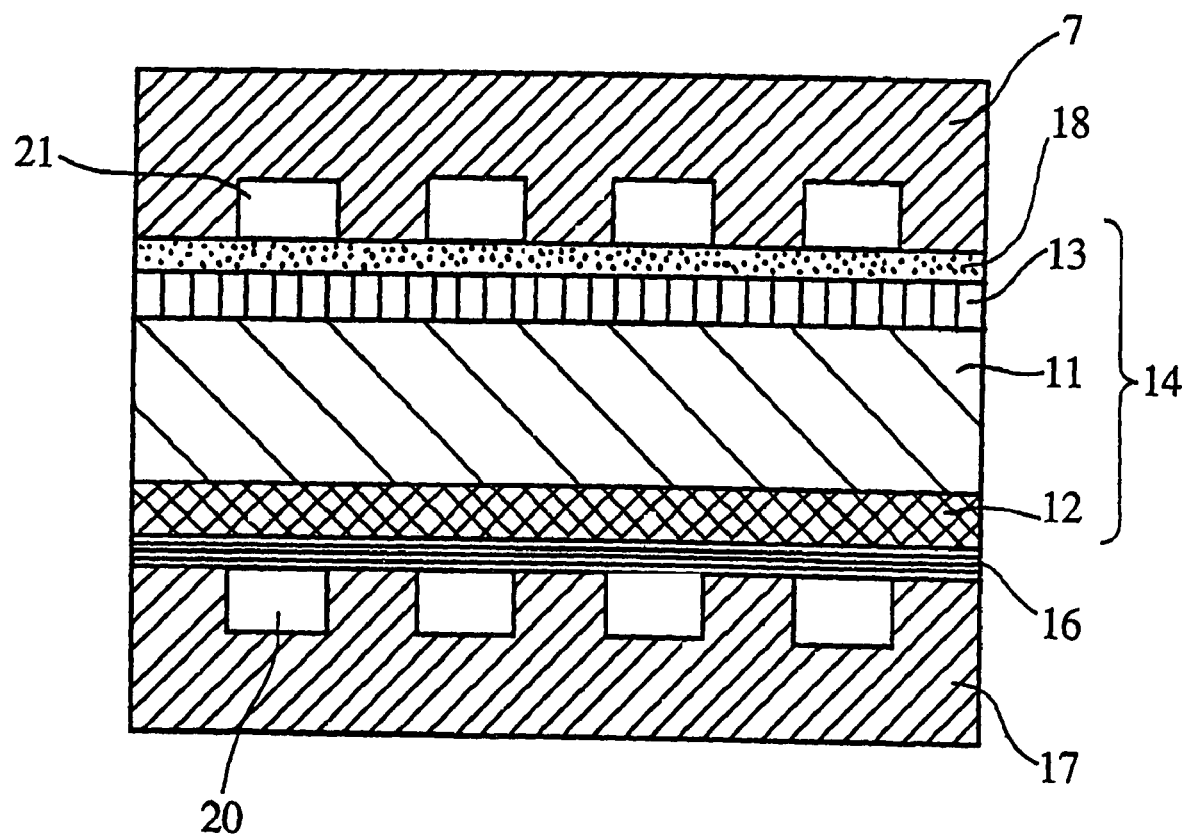
FIG. 2 is a sectional schematic view showing a laminated structure of the solid electrolyte type fuel cell more plainly.

As shown in FIGS. 1 and 2, a solid electrolyte type fuel cell 10 includes an electric power generation cell 14 made up of a solid electrolyte layer 11, a fuel electrode layer 12 and an air electrode layer 13, which are disposed at both sides of this solid electrolyte layer 11, a fuel electrode current collector 16, an air electrode current collector 18, and metal separators 17 constructed so that a fuel gas can be supplied to the fuel electrode layer 12 and an oxidizing agent gas containing oxygen can be supplied to the air electrode layer 13, and is constructed so as to operate at a temperature lower than 950° C.

The solid electrolyte layer 11 is formed of lanthanum gallate solid oxide, Sc-stabilized zirconium, Y-stabilized zirconium, or ceria base oxide.

The fuel electrode layer 12 is made of metal such as Ni, or cermet such as Ni-YSZ (Ni doped $Y_2O_3$ stabilized $ZrO_2$). Alternatively, it is formed of a mixture of Ni and a compound expressed by a general formula (1): $Ce_{1-m}D_mO_2$. Where, in the general formula (1), D denotes one kind of or not less than two kinds of elements selected from a group consisting of Sm, Gd, Y and Ca, and m denotes an atomic ratio of the D element and is preferably set to be within a range of 0.05 to 0.4, preferably, 1 to 0.3.

The air electrode layer 13 is formed of an oxide ion conductor expressed by a general formula (2): $Ln1_{1-x}Ln2_xE_{1-y}Co_yO_{3+d}$. Where, in the general formula (2), Ln1 is one element of or both elements of La and Sm, Ln2 is one element or both elements of Ba, Ca and Sr, and E is one element or both elements of Fe and Cu. Besides, x denotes an atomic ratio of Ln2 and is set to be within a range of more than 0.5 and less than 1.0. Besides, y denotes an atomic ratio of the Co element and is set to be within a range of more than 0 and not larger than 1.0, preferably, from 0.5 to 1.0. Besides, d is set within a range of from −0.5 to 0.5.

The electric power generation cell 14 is fabricated in such a manner that the fuel electrode layer 12 is formed on one side of the solid electrolyte layer 11, and the air electrode layer 13 is further formed on the other side of the solid electrolyte layer 11, and they are baked at 1000° C.

The metal separator 17 is formed of a metal other than silver or silver alloy. This metal separator is plated with one of silver and silver alloy. By plating the metal separator with silver or silver alloy, the electric resistance can be remarkably decreased for a long time. The metal separator 17 is plated with nickel, and is plated with silver or silver alloy while this nickel plating is used as an under layer, so that the adhesion between the metal separator 17 and the silver or the silver alloy is improved.

The material of the metal separator includes stainless steel, nickel base heat resistant alloy, and cobalt base alloy. The stainless steel includes SUS 430 (18Cr—Fe), SUS 310S (20Ni-25Cr—Fe), SUS 316 (18Cr-12Ni-2.5Mo—Fe) and the like, the nickel base heat resistant alloy includes Inconel 600 (15.5Cr-7Fe—Ni), Inconel 718 (19Cr-3Mo-19Fe—Ni), Haynes alloy 214 (16Cr-2Fe-4.5Al—Ni), Haynes alloy 230 (16Cr-2Mo-14W—Ni), Hastelloy C-22 (22Cr-13Mo-3W-4Fe—Ni) and the like, the cobalt base alloy includes ULTMET (26Cr-5Mo-2W-3Fe-9Ni—Co), Haynes alloy 188 (22Cr-14.5W—Co) and the like. As the stainless steel, ferrite stainless steel is preferable since it has excellent adhesion to silver. A method of plating the metal separator with silver or silver alloy includes electroplating. This electroplating method is a surface treatment method for electrochemically depositing (electrodeposition) metal on the surface of metal or nonmetal.

The metal separator 17 includes an air inlet 17a and a fuel gas inlet 17c at its side portions, and includes an air blowoff port 17b for guiding the air introduced in the air inlet 17a to the air electrode layer 13, and a fuel gas blowoff port 17d for guiding the fuel gas introduced in the fuel gas inlet 17c to the fuel electrode layer 12. Further, as shown in FIG. 2, it includes a groove 20 as a fuel passage at a side of the metal separator in contact with the fuel electrode current collector 16 and a groove 21 as an air passage at a side in contact with the air electrode current collector 18.

The fuel electrode current collector 16 is a porous body made of platinum, nickel or silver.

The air electrode current collector 18 is a porous body 18a made of silver or silver alloy, or a porous body in which a porous body of metal other than silver or silver alloy is coated with silver. This porous body 18a is made of a skeletal portion (skeleton) and pores as shown in a partial enlarged view of FIG. 3, and is a sponge metal porous body having a three-dimensional structure. It is preferable that its porosity is within a range of 60 to 97%.

In a temperature range of not lower than 200° C. and lower than 950° C., silver is reduced even in an oxidizing atmosphere, and a solid metal phase becomes a stable phase. Accordingly, in the porous body having the surface made of silver, an oxide film is not formed in the temperature range of not lower than 200° C. and lower than 950° C., and it is an excellent conductor. However, when the solid electrolyte type fuel cell incorporating the air electrode current collector made of the silver porous body is operated at a temperature of lower than 950° C., although an oxide film is not produced on the surface of the air electrode current collector made of the silver porous body, since silver dissolves oxygen at a high temperature, it starts to melt at about 950° C. Thus, it is desirable that the operation temperature of the solid electrolyte type fuel cell incorporating the air electrode current collector of the porous body made of the silver or the silver alloy or the porous body in which the metal matrix other than the silver or the silver alloy is coated with silver, is lower than 950° C. It is preferably lower than 930° C.

In the case where the air electrode current collector 18 is the porous body in which the porous body other than the silver or the silver alloy is coated with silver, the metal matrix other than the silver or the silver alloy is plated with nickel, and is plated with silver while this nickel plating is used as the under layer, so that the high adhesion between the metal matrix and the silver can be obtained, which is preferable.

Figure 3:
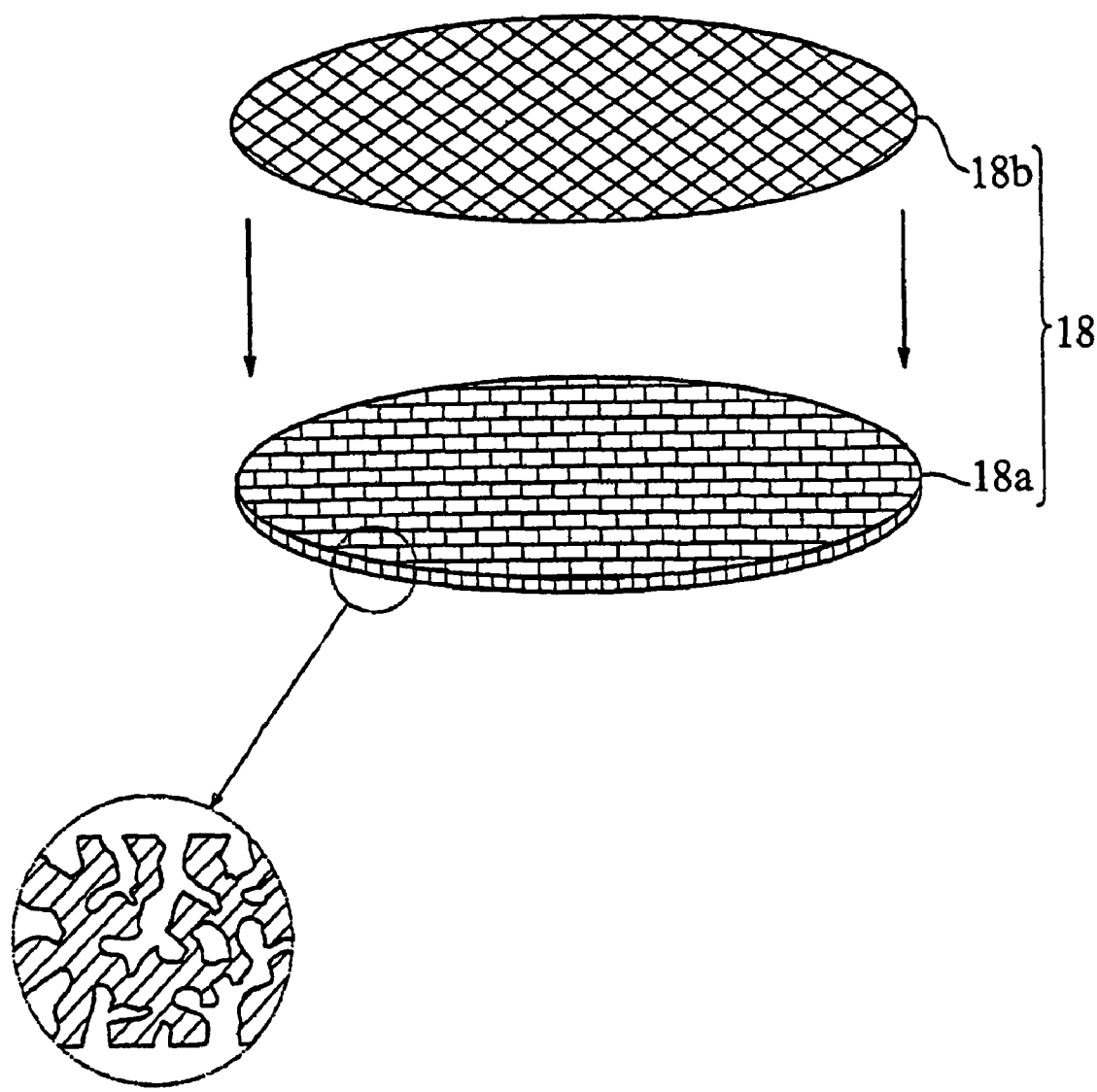
FIG. 3 is a schematic view showing an embodiment of an air electrode current collector used for a solid electrolyte type fuel cell of the invention.

Besides, as shown in FIG. 3, the porous body 18a may be reinforced by a mesh metal body 18b. This mesh metal body 18b is silver or silver alloy, or a metal body in which a metal matrix other than silver or silver alloy is coated with silver or silver alloy. In the case where the porous body 18a and the mesh metal body 18b are such that the metal matrix other than the silver or the silver alloy is coated with silver, the metal matrix includes nickel, stainless, nickel base alloy, cobalt base alloy and the like. The metal matrix is plated with nickel, and is plated with silver while this nickel plating is used as the under layer, so that the high adhesion between the metal matrix and the silver can be obtained, which is preferable. The opening of the mesh metal body 18b is within a range of 0.5 to 1000 μm.

It is conceivable that the reason why the electric power generation performance of the solid electrolyte type fuel cell incorporating the air electrode current collector of the porous body containing silver is improved at a low temperature is as follows: In general, in the air electrode layer, oxygen in the air receives an electron by the air electrode current collector, and an oxygen ion ($O^{-2}$) is generated, however, in the case where silver containing a very small amount of oxygen is made the air electrode current collector, the very small amount of oxygen contained in the air electrode current collector has a function to promote generation of the oxygen ion at the surface of the current collector, and the oxygen ion can be quickly moved from the surface of the current collector; by a rise in exchange current density between the air electrode current collector and the electrode, the movement of the oxygen ion becomes faster; and dissociation ($O_2 \rightarrow 2O$) of oxygen and ionization ($O+2e \rightarrow O^{-2}$) are also promoted by oxygen dissolved in the air electrode current collector made of the porous body containing silver.

The operation of the solid electrolyte type fuel cell constructed as shown in FIGS. 1 and 2 will be described. When the fuel gas ($H_2$, CO, etc.) is introduced into the fuel gas inlet 17c, it passes through the pores in the fuel electrode current collector 16 and is quickly supplied to the fuel electrode layer 12. On the other hand, when air is introduced into the air inlet 17a, it passes through the pores in the air electrode current collector 18 and is quickly supplied to the air electrode layer 13. The oxygen supplied to the air electrode layer 13 passes through the pores in the air electrode layer 13, reaches the vicinity of an interface with the solid electrolyte layer 11, receives an electron from the air electrode layer 13 at this portion, and is ionized into an oxide ion ($O^{2-}$). This oxide ion diffuses and moves in the solid electrolyte layer 11 toward the fuel electrode layer 12, and when it reaches the vicinity of an interface with the fuel electrode layer 12, it reacts with the fuel gas at this portion to produce a reaction product ($H_2O$, $CO_2$, etc.), and releases an electron into the fuel electrode layer 12. This electron is extracted by the fuel electrode current collector 16, so that a current is generated, and electric power is obtained.

The description has been made such that the foregoing air electrode current collector made of the porous body of silver or silver alloy is combined with the metal separator plated with one of silver and silver alloy and is incorporated in the solid electrolyte type fuel cell.

However, the air electrode current collector made of the porous body of silver or silver alloy is not necessarily used in combination with the metal separator plated with one of silver and silver alloy, and as long as the solid electrolyte type fuel cell has the laminated structure as shown in FIGS. 1 and 2, for example, it can be used in combination with the separator made of ceramics, for example, lanthanum chromite. The air electrode current collector described below is described as the air electrode current collector widely used for the solid electrolyte type fuel cell having the laminated structure shown in FIGS. 1 and 2.

That is, the air electrode current collector of the invention may be an oxide adhesion porous body in which an oxide film is formed on the surface of a silver porous body to increase the mechanical strength, in addition to the porous body of silver or silver alloy. The oxide to be adhered to the surface of the oxide adhesion porous body includes aluminum oxide, titanium oxide, silicon oxide and the like.

The air electrode current collector of the solid electrolyte type fuel cell has a role to function as a flow passage in which air as the oxidizing agent gas flows. Accordingly, it is further preferable that the silver porous body used as the air electrode current collector of the solid electrolyte type fuel cell is a dispersion strengthened silver porous body in which an oxide is dispersed in the silver matrix to improve the mechanical strength.

The oxide contained in the dispersion strengthened silver in which the oxide is dispersed in the silver matrix, specifically includes tin oxide, indium oxide, lanthanum oxide, copper oxide, chromium oxide, titanium oxide, aluminum oxide, iron oxide, nickel oxide, vanadium oxide, magnesium oxide, calcium oxide, strontium oxide, barium oxide, and the like, and the tin oxide is most preferable. It is preferable that the content of the oxide contained in this dispersion strengthened silver is 3 to 50 vol. %, and the reason is that when it is less than 3 vol. %, strengthening as the air electrode current collector of the solid electrolyte type fuel cell is insufficient, and when it exceeds 50 vol. %, the function as the air electrode current collector is lowered, and sufficient output density can not be obtained. Then, it is further preferable that this dispersion strengthened silver porous body is constructed to have the outermost surface substantially made of silver and the inside made of dispersion strengthened silver.

In the case where the porous body of silver alloy is used as the air electrode current collector, the silver alloy with a melting point of 600° C. or higher (preferably, 800° C. or higher) is used. Although any alloys may be used as long as they are silver alloys having the melting point of 600° C. or higher, among these silver alloys, a silver alloy containing not more than 40% by mass of one of or at least two of Cu, Zn, Cd, Ni, Sn, Au, Pt, Pd, Ir and Rh in total, and the remainder of Ag and an inevitable impurity can be preferably used.

The reason why the content of one of or at least two of Cu, Zn, Cd, Ni, Sn, Au, Pt, Pd, Ir and Rh is made 40% by mass or less in total is that when it exceeds 40% by mass, the catalytic function of Ag is lowered, which is not preferable.

It is further preferable that the silver alloy porous body having the melting point of 600° C. or higher is a dispersion strengthened silver porous body in which an oxide is dispersed in a silver alloy matrix containing not more than 40% by mass of one of or at least two of Cu, Zn, Cd, Ni, Sn, Au, Pt, Pd, Ir and Rh in total and the remainder of Ag and an inevitable impurity.

Further, the air electrode current collector used for the solid electrolyte type fuel cell of the invention may be constituted by a porous body which is made of a porous body of metal or alloy having high temperature strength more superior than silver, in which a silver plating layer is formed on at least a side of the porous body in contact with the air electrode. In order to form the silver plating layer, a Ni plating layer is generally formed as an under layer, and the silver plating layer is formed on this Ni plating under layer. A plating method for forming this Ni plating under layer and the silver plating layer is not particularly limited, and they may be formed by any plating method.

It is preferable that the metal or the alloy having the high temperature strength more superior than the silver is Ni or Ni base alloy, Fe or Fe base alloy, or Co or Co alloy, and specifically, the Ni or Ni base alloy includes pure Ni, Inconel 600, Hastelloy C-22, Haynes alloy 214 and the like, the Fe or Fe base alloy includes pure Fe, carbon steel, stainless steel, esit steel and the like, and the Co or Co alloy includes Haynes alloy 188, ULTET and the like.

It is sufficient if the porosity of the porous body constituting the air electrode current collector of the invention and containing silver is 60 to 97%. It is preferable that a minute pore does not exist in the skeleton, and in case the minute pore exists in the skeleton, it is necessary to suppress it to less than 10% of the total. When the porosity of the skeleton becomes 10% or more, the strength as the air electrode current collector is lowered, which is not desirable.

Further, the air electrode current collector used for the solid electrolyte type fuel cell of the invention may be constituted by a silver felt made of a silver fiber or a silver mesh made of a silver thin wire.

In the air electrode current collector constituted by the silver felt or the silver mesh, when the silver felt or the silver mesh is exposed to a high temperature for a long time, since silver is low in high temperature strength, the silver felt and the silver mesh are shrunk and sintered to decrease the void ratio, and the function as the air electrode current collector of the solid electrolyte type fuel cell can become low.

Research has been conducted to obtain an air electrode current collector constituted by a silver felt or a silver mesh in which even if the air electrode current collector is exposed to a high temperature for a long time, the decrease of a void ratio due to shrinkage is small, and accordingly, the function as the air electrode current collector is not lowered for a long time. As a result, it has been found that in an air electrode current collector constituted by a silver plated felt made of a silver plated fiber in which a metal fiber of metal or alloy having high temperature strength more superior than silver is plated with silver, or an air electrode current collector constituted by a silver plated mesh obtained by giving silver plating to a metal mesh made of a metal thin wire of metal or alloy having high temperature strength more superior than silver, since the metal fiber and the metal thin wire made of the metal or the alloy having the high temperature strength more superior than the silver keep the skeleton at a high temperature, as compared with the air electrode current collector constituted by the silver felt made of the silver fiber and the air electrode current collector constituted by the silver mesh made of the silver thin wire, even when it is used at a high temperature for a long time, the void ratio of the air electrode current collector is hardly decreased.

It is preferable that the metal or the alloy having the high temperature strength more superior than the silver is Ni or Ni base alloy, Fe or Fe base alloy, or Co or Co base alloy.

Hereinafter, examples of the invention, together with comparative examples, will be described.

Examples 1 to 3

First, a pure silver atomized powder having a mean particle diameter of 2 µm was prepared. This pure silver atomized power is a powder obtained by dissolving pure silver by a normal melting furnace and atomizing the obtained pure silver melt. Further, n-hexane as an organic solvent, dodecylbenzene sodium sulphonate (hereinafter referred to as DBS) as a surface active agent, hydroxypropyl methylcellulose (hereinafter referred to as HPMC) as a water soluble resin binder, glycerin as a plasticizer, and distilled water as water were respectively prepared.

Next, after the pure silver atomized powder and the HPMC (water soluble resin binder) were inserted in a strong shearing type kneading machine and were kneaded for 30 minutes, 50% by mass of all distilled water required to be added was added and kneading was performed. Further, 50% by mass of the remaining distilled water, and other additives of the n-hexane (organic solvent), the DBS (surface active agent) and the glycerine (plasticizer) were added and kneading was performed for 3 hours, so that mixed slurry containing 50.0% by mass of pure silver atomized powder, 1.5% by mass of n-hexane, 5.0% by mass of HPMC, 2.0% by mass of DBS, and 3.0% by mass of glycerine was prepared. The remaining constituent is distilled water.

Next, a compact having a thickness of about 1 mm was fabricated from this mixed slurry by a doctor blade method, and this compact was foamed, degreased and sintered under conditions shown in Table 1 below, so that a pure silver porous plate having a thickness of about 0.7 mm was prepared.

TABLE 1

| | Foaming condition | Degreasing condition | Sintering condition |
|---|---|---|---|
| Atmosphere | — | In air | In air |
| Moisture | 90% | — | — |
| Temperature | 35° C. | 450° C. | 910° C. |
| Holding time | 10 min. | 60 min. | 120 min. |

This pure silver porous plate was cut to have a predetermined size, and a pure silver porous body having a three-dimensional skeletal structure with a porosity of 92 to 97% was produced. As a reinforcing member of the pure silver porous body, a mesh metal body made of an expand metal made of silver was prepared. The pure silver porous body and the mesh metal body were stacked and were subjected to skin pass rolling to form one body, so that the air electrode current collector as shown in FIG. 3 was produced.

The solid electrolyte layer was formed of lanthanum gallate solid oxide. The lanthanum gallate solid oxide was produced by the following method. As base powders, respective powders of $La_2O_3$, $SrCO_3$, $Ga_2O_3$, $MgO$ and $CoO$ are prepared, these base powders are respectively weighed to form $La_{0.8}Sr_{0.2}Ga_{0.8}Mg_{0.15}Co_{0.05}O_3$, the respective powders are mixed, and this mixture is preliminarily fired at 1100° C. The obtain temporarily fired body is pulverized, a normal binder, a solvent and the like are added, and they are pulverized by a ball mill to prepare slurry, and this slurry is shaped into a green sheet by a doctor blade method. The shaped green sheet is sufficiently dried in the air, and is cut to have a predetermined size, and this is sintered at 1450° C., so that the lanthanum gallate solid oxide is obtained. Here, the doctor blade method is one of methods for molding into sheet shape, and is a method in which the thickness of a slip placed on and transferred by a carrier such as a carrier film or an endless belt, the thickness of a sheet is precisely controlled by adjusting an interval between a knife edge called a doctor blade and the carrier.

A nickel porous body was used for the fuel electrode current collector. The solid electrolyte layer was sandwiched between the fuel electrode layer and the air electrode layer to constitute a single cell of an electric power generation cell. Next, as metal separator materials, SUS430 (example 1), Inconel 600 alloy (example 2) and ULTMET alloy (example 3) were respectively prepared. The surfaces of the metal separator materials were plated with silver by an electric plating method to form a plating of a thickness of 2 to 5 μm and the metal separators were formed. Two single cells were stacked to form a two-stage cell stack, and this two-stage cell stack was sandwiched between the metal separators to obtain the fuel cell.

Comparative Examples 1 to 3

Metal separators identical to the examples 1 to 3 except that silver plating was not given to the metal separators of the examples 1 to 3, and platinum porous bodies of 200 mesh were used for air electrode current collectors, were used and fuel cells were prepared similarly to the examples 1 to 3.

Examples 4 to 6

Metal separators identical to the examples 1 to 3 except that the solid electrolyte layer was formed of Sc-stabilized zirconia, were used, and fuel cells were prepared similarly to the examples 1 to 3.

Sc-stabilized zirconia was produced by the following method. $Sc_2O_3$ and $ZrOCl_2$ are made starting materials, a predetermined amount of $Sc_2O_3$ is added as a nitric acid solution to a monoclinic $ZrO_2$ sol obtained by hydrolysis of a $ZrOCl_2$ solution, urea is added, temperature is kept at 90° C., they are made to be uniformly deposited, and this deposit is temporarily fired at 600° C. This temporarily fired body is fired at 1400° C. for one hour, so that Sc-stabilized zirconia is obtained.

Comparative Examples 4 to 6

Metal separators identical to the examples 4 to 6 except that silver plating was not given to the metal separators of the examples 4 to 6, and platinum porous bodies of 200 mesh were used for air electrode current collectors, were used and fuel cells were prepared similarly to the examples 4 to 6.

Examples 7 to 9

Metal separators identical to the examples 1 to 3 except that solid electrolyte layers were formed of y-stabilized zirconia using a 8% $Y_2O_3$ doped $ZrO_2$ powder, were used and fuel cells were prepared similarly to the examples 1 to 3.

Y-stabilized zirconia was produced by the following method. $Y_2O_3$ and $ZrOCl_2$ are made starting materials, a predetermined amount of $Y_2O_3$ is added as a nitric acid solution to a monoclinic $ZrO_2$ sol obtained by hydrolysis of a $ZrOCl_2$ solution, urea is added, a temperature is kept at 90° C., they are made to be uniformly deposited, and this deposit is temporarily fired at 600° C. This temporarily fired body is fired at 1400° C. for one hour, so that Y-stabilized zirconia is obtained.

Comparative Examples 7 to 9

Metal separators identical to the examples 7 to 9 except that silver plating was not given to the metal separators of the examples 7 to 9, and platinum porous bodies of 200 mesh were used for air electrode current collectors, were used and fuel cells were fabricated similarly to the examples 7 to 9.

Examples 10 to 12

Metal separators identical to the examples 1 to 3 except that solid electrolyte layers were formed of gadolina doped ceria base oxide using a $Ce_{0.9}Gd_{0.1}O_{1.95}$ powder, were used and fuel cells were fabricated similarly to the examples 1 to 3.

The gadolina doped ceria base oxide was produced by the following method. $CeO_2$ and $Gd_2O_3$ are mixed to obtain a composition of $Ce_{0.9}Gd_{0.1}O_{1.95}$, and are temporarily fired at 1250° C. for 20 hours. This temporarily fired body is fired at 1600° C. for 30 hours, so that the gadolina doped ceria base oxide is obtained.

Comparative Examples 10 to 12

Metal separators identical to the examples 10 to 12 except that silver plating was not given to the metal separators of the examples 10 to 12, and platinum porous bodies of 200 mesh were used for air electrode current collectors, were used and fuel cells were prepared similarly to the examples 10 to 12.

<Comparative Estimation>

The fuel cells of the examples 1 to 12 and the comparative examples 1 to 12 were operated to generate electricity at 700° C. for 500 hours while a hydrogen gas as a fuel gas was supplied at 3 cc/cm$^2$/minute, and air as an oxidizing agent gas was supplied at 15 cc/cm$^2$/minute, and the performance evaluation of electric power generation output of the respective fuel cells after 500 hours had passed was performed. Here, the electric power generation performance was evaluated by a mean value of outputs per single cell obtained by adjusting a potential difference between the fuel electrode current collector and the air electrode current collector to 0.7 V and making measurements. Table 2 shows electric power generation performances of the fuel cells of the examples 1 to 12 and the comparative examples 1 to 12, respectively.

TABLE 2

| | Metal Separator | Silver Plating | Current Collector Air Electrode | Current Collector Fuel Electrode | Solid Electrolyte Layer | Mean Value of Single Cell Output [mW/cm$^2$] |
|---|---|---|---|---|---|---|
| Ex. 1 | SUS430 | With | Silver Porous | Nickel Porous | Lanthanum Gallate | 465 |
| Ex. 2 | Inconel 600 | With | Body + Reinforcing | Body | Solid Oxide | 470 |
| Ex. 3 | ULTMET | With | Member | | | 472 |
| Ex. 4 | SUS430 | With | | | Sc-Stabilized | 160 |
| Ex. 5 | Inconel 600 | With | | | Zirconia | 219 |
| Ex. 6 | ULTMET | With | | | | 221 |
| Ex. 7 | SUS430 | With | | | Y-Stabilized | 126 |
| Ex. 8 | Inconel 600 | With | | | Zirconia | 129 |
| Ex. 9 | ULTMET | With | | | | 131 |
| Ex. 10 | SUS430 | With | | | Gadolina Doped | 231 |
| Ex. 11 | Inconel 600 | With | | | Ceria Base Oxide | 240 |
| Ex. 12 | ULTMET | With | | | | 241 |
| Comp. Ex. 1 | SUS430 | Without | Platinum | | Lanthanum Gallate | 298 |
| Comp. Ex. 2 | Inconel 600 | Without | Porous Body | | Solid Oxide | 295 |
| Comp. Ex. 3 | ULTMET | Without | | | | 290 |
| Comp. Ex. 4 | SUS430 | Without | | | Sc-Stabilized | 106 |
| Comp. Ex. 5 | Inconel 600 | Without | | | Zirconia | 145 |
| Comp. Ex. 6 | ULTMET | Without | | | | 142 |
| Comp. Ex. 7 | SUS430 | Without | | | Y-Stabilized | 81 |
| Comp. Ex. 8 | Inconel 600 | Without | | | Zirconia | 84 |
| Comp. Ex. 9 | ULTMET | Without | | | | 84 |
| Comp. Ex. 10 | SUS430 | Without | | | Gadolina Doped | 153 |
| Comp. Ex. 11 | Inconel 600 | Without | | | Ceria Base Oxide | 162 |
| Comp. Ex. 12 | ULTMET | Without | | | | 165 |

As is apparent from Table 2, as compared with the comparative examples 1 to 12 in which the metal separators were not plated with silver and the platinum porous bodies were used for the air electrode current collectors, in the examples 1 to 12 in which the same electrolyte materials were used, the metal separators were plated with silver, and the silver porous bodies were used for the air electrode current collectors, the output mean values per unit cell exceeded.

Example 13

A pure silver porous body plate having a thickness of 1.5 mm was produced similarly to the production method shown in the example 1, this pure silver porous body plate was cut, and an air electrode current collector made of the pure silver porous body having a porosity shown in Table 3 was prepared.

Further, similarly to the production method shown in the example 1, a lanthanum gallate solid oxide sintered body having a thickness of 110 μm was produced, and this was made a solid electrolyte layer. A mixture powder of NiO and $(Ce_{0.8}Sm_{0.2})O_2$ in which they were mixed so that a volume ratio of Ni to $(Ce_{0.8}Sm_{0.2})O_2$ was 6:4, was fired to one side of this solid electrolyte layer at 1100° C. to form a fuel electrode layer, and further, $(Sm_{0.5}Sr_{0.5})CoO_3$ was fired to the other side of the solid electrolyte layer at 1000° C. to form an air electrode layer, so that a cell was fabricated.

Further, after a lanthanum chromite powder was subjected to isostatic pressing to form a plate, a groove was formed by machining, and next, sintering at 1450° C. was performed, so that a separator having the groove at one side was fabricated. Besides, a Ni felt was prepared as a fuel electrode current collector.

The Ni felt as the fuel electrode current collector was stacked at the fuel electrode side of the cell fabricated in this way, the air electrode current collector made of the pure silver porous body was stacked at the air electrode side of the cell, and further, the separators were stacked on the fuel electrode current collector and the air electrode current collector, so that a solid electrolyte type fuel cell 1 having the structure shown in FIG. 2 was prepared.

Conventional Example 1

Further, for comparison, an air electrode current collector made of a platinum mesh was prepared, and a conventional solid electrolyte type fuel cell 1 was prepared similarly to the example 1 except that instead of the air electrode current collector of the invention made of the pure silver porous body of the example 13, the air electrode current collector made of the platinum mesh was incorporated.

While the solid electrolyte type fuel cell 1 of the invention obtained in this way and the conventional solid electrolyte type fuel cell 1 were kept at 700° C., a dry hydrogen gas was made to flow as a fuel gas, air was made to flow as an oxidizing agent gas, current density at 0.7 V was measured with respect to the solid electrolyte type fuel cell 1 of the invention and the conventional solid electrolyte type fuel cell 1, and the results were shown in Table 3.

TABLE 3

| Type | | Air Electrode Current Collector Composition | Air Electrode Current Collector Porosity (%) | Current Density (mA/cm$^2$) at 0.7 V |
|---|---|---|---|---|
| Solid Electrolyte Type Fuel Cell of the Invention | 1 | Pure Silver | 92 | 595 |
| Conventional Solid Electrolyte Type Fuel Cell | 1 | Platinum Mesh | | 360 |

From the results shown in Table 3, it is understood that the solid electrolyte type fuel cell 1 of the invention in which the air electrode current collector made of the pure silver porous body is incorporated is greatly improved in the current density at 0.7 V as compared with the conventional solid electrolyte type fuel cell 1 in which the air electrode current collector made of the platinum mesh fabricated in the conventional example 1 is incorporated.

Example 14

As oxide powders, $SnO_2$ powder having a mean particle diameter of 0.5 μm, $In_2O_3$ powder having a mean particle diameter of 0.5 μm, $La_2O_3$ powder having a mean particle diameter of 0.5 μm, and $Fe_2O_3$ powder having a mean particle diameter of 0.5 μm, all of which were commercially available, were prepared.

The $SnO_2$ powder, the $In_2O_3$ powder, the $La_2O_3$ powder, or the $Fe_2O_3$ powder was mixed to the pure silver atomized powder prepared in the example 13, and they were pulverized and mixed by a ball mill for 100 hours to perform mechanical alloying, so that a silver-oxide dispersion strengthened alloy powder in which oxide was dispersed in the inside was prepared. The obtained silver-oxide dispersion strengthened alloy powder was used, and was shaped and sintered under the same condition as the example 13, so that the air electrode current collectors made of the dispersion strengthened silver porous bodies having the compositions and porosities shown in Table 4 were fabricated. By stacking the air electrode current collectors made of these dispersion strengthened silver porous bodies to air electrode sides of cells, solid electrolyte type fuel cells 2 to 5 of the invention having the structure shown in FIG. 2 were fabricated similarly to the example 13. With respect to the solid electrolyte type fuel cells 2 to 5 of the invention, current density at 0.7 V was measured and the results were shown in Table 4.

TABLE 4

| Type | | Air Current Collector Made of Dispersion Strengthened Silver | | Porosity (%) | Current Density (mA/cm$^2$) at 0.7 V |
|---|---|---|---|---|---|
| | | Composition (vol. %) | | | |
| | | Oxide | Ag | | |
| Solid Electrolyte Type Fuel Cell of the Invention | 2 | $SnO_2$: 12 | Remainder | 91 | 578 |
| | 3 | $In_2O_3$: 10 | Remainder | 92 | 581 |
| | 4 | $La_2O_3$: 11 | Remainder | 91 | 585 |
| | 5 | $Fe_2O_3$: 10 | Remainder | 95 | 555 |

From the results shown in FIG. 4, it is understood that the solid electrolyte type fuel cells 2 to 5 of the invention in each of which the air electrode current collector made of the dispersion strengthened silver porous body is incorporated are greatly improved in the current density at 0.7 V as compared with the conventional solid electrolyte type fuel cell 1 of Table 3 fabricated in the conventional example 1.

Example 15

The air electrode current collector made of the pure silver porous body fabricated in the example 13 was made a base body, an $Al_2O_3$ film having a thickness of 5 μm was formed by vacuum evaporation on the surface of this base body to fabricate an oxide adhesion air electrode current collector with increased mechanical strength, and a solid electrolyte type fuel cell 6 of the invention was fabricated in which the oxide adhesion air electrode current collector with the increased mechanical strength was incorporated. As a result of measurement of current density at 0.7 V with respect to the solid electrolyte type fuel cell 6 of the invention, the measured current density is 583 mA/cm$^2$, and it is understood that this value is greatly improved as compared with the conventional solid electrolyte type fuel cell 1 of Table 3 fabricated in the conventional example 1.

Example 16

As silver alloy powders, silver alloy atomize powders each having a mean particle diameter of 1.5 μm and having a composition shown in Table 5 were prepared. These silver alloy atomize powders were used, and shaping and sintering were performed under the same condition as the example 13, so that air electrode current collectors made of the silver alloy porous bodies having compositions and porosities shown in Table 5 were fabricated. By stacking the air electrode current collectors made of these dispersion strengthened silver porous bodies to air electrode sides of cells, solid electrolyte type fuel cells 7 to 20 of the invention having the structure shown in FIG. 2 were prepared similarly to the example 13. With respect to the solid electrolyte type fuel cells 7 to 20 of the invention, current density at 0.7 V was measured and the results were shown in Table 5.

TABLE 5

| Type | | Air Current Collector Made of Silver Alloy Porous Body | | | | | | | | | | Porosity (%) | Current Density (mA/cm$^2$) at 0.7 V |
|---|---|---|---|---|---|---|---|---|---|---|---|---|---|
| | | Composition (% by mass) | | | | | | | | | | | |
| | | Cu | Zn | Cd | Ni | Sn | Au | Pt | Pd | Ir | Rh | Ag | | |
| Solid Electrolyte Type Fuel Cell of the Invention | 7 | 18 | — | — | — | — | — | — | — | — | — | Remainder | 93 | 551 |
| | 8 | 25 | 10 | — | — | — | — | — | — | — | — | Remainder | 93 | 555 |
| | 9 | 18 | 10 | 6 | — | — | — | — | — | — | — | Remainder | 93 | 590 |
| | 10 | — | — | 26 | 2 | — | — | — | — | — | — | Remainder | 90 | 560 |
| | 11 | 16 | 11 | — | — | 3 | — | — | — | — | — | Remainder | 96 | 556 |
| | 12 | 25 | — | — | 1 | — | — | — | — | — | — | Remainder | 92 | 571 |
| | 13 | — | 10 | — | — | 1 | — | — | — | — | — | Remainder | 94 | 562 |
| | 14 | — | — | 3 | — | 4 | — | — | — | — | — | Remainder | 91 | 585 |
| | 15 | — | — | 7 | 2 | — | — | — | — | — | — | Remainder | 91 | 570 |
| | 16 | — | — | — | — | 5 | — | — | — | — | — | Remainder | 93 | 588 |
| | 17 | — | — | — | — | — | 3 | — | — | — | — | Remainder | 91 | 587 |
| | 18 | — | — | — | — | — | — | 4 | — | — | — | Remainder | 94 | 585 |
| | 19 | — | — | — | — | — | — | — | — | 2 | — | Remainder | 94 | 590 |
| | 20 | — | — | — | — | — | — | — | — | — | 1 | Remainder | 93 | 593 |

From the results shown in Table 5, it is understood that the solid electrolyte type fuel cells 7 to 20 of the invention each incorporating the air electrode current collector made of the silver alloy porous body containing not more than 40% by mass of one of or at least two of Cu, Zn, Cd, Ni, Sn, Au, Pt, Pd, Ir and Rh in total, and the remainder of Ag and an inevitable impurity are greatly improved in the current density at 0.7 V as compared with the conventional solid electrolyte type fuel cell 1 of Table 3 fabricated in the conventional example 1.

Example 17

Air electrode current collectors made of dispersion strengthened silver alloy porous bodies having compositions and porosities in which oxides were uniformly dispersed in the silver alloy porous body matrixes used for the solid electrolyte type fuel cells 7 to 20 of the invention of the example 16 were stacked to air electrode sides of cells, so that solid electrolyte type fuel cells 21 to 34 of the invention having the structure shown in FIG. 2 were fabricated similarly to the example 13. With respect to the solid electrolyte type fuel cells 21 to 34 of the invention, current density at 0.7 V was measured and the results were shown in Table 6.

conventional solid electrolyte type fuel cell 1 of Table 3 fabricated in the conventional example 1.

Example 18

As alloy powders having high temperature strength more superior than silver, respective atomized powders of SUS430 (composition, Cr: 17% is contained, and the remainder is Fe and an inevitable impurity), SUS304 (composition, Ni: 9.3% and Cr: 18.4% are contained, and the remainder is Fe and an inevitable impurity), Ni-10% Cr alloy, INCONEL 600 (Cr: 15.5% and Fe: 7% are contained, and the remainder is Ni and an inevitable impurity), Haynes alloy 188 (Ni: 22%, Cr: 22% W: 14.5%, and Fe: 1.5% are contained, and the remainder is Co and an inevitable impurity), each having a mean particle diameter of 2.1 μm and shown in Table 7, were prepared, and these alloy atomized powders were used to perform shaping, and sintering was performed in vacuum at temperature shown in Table 7, so that alloy porous bodies having porosities shown in Table 7 were fabricated. After Ni plating under layers having thicknesses shown in Table 7 were formed at one sides of the alloy porous bodies, Ag plating layers were formed, so that air electrode current collectors were fabri-

TABLE 6

| | | Air Current Collector Made of Dispersion Strengthened Silver Alloy Porous Body | | |
|---|---|---|---|---|
| | | Composition (vol. %) | | Current Density |
| Type | Oxide | Silver Alloy | Porosity (%) | (mA/cm$^2$) at 0.7 V |
| Solid Electrolyte Type Fuel Cell of the Invention | 21 SiO$_2$: 8 | Silver Alloy Used in Solid Electrolyte Type Fuel Cell 7 of the Invention: Remainder | 93 | 563 |
| | 22 TiO$_2$: 13 | Silver Alloy Used in Solid Electrolyte Type Fuel Cell 8 of the Invention: Remainder | 93 | 532 |
| | 23 Fe$_2$O$_3$: 7 | Silver Alloy Used in Solid Electrolyte Type Fuel Cell 9 of the Invention: Remainder | 95 | 542 |
| | 24 NiO: 15 | Silver Alloy Used in Solid Electrolyte Type Fuel Cell 10 of the Invention: Remainder | 92 | 540 |
| | 25 MgO: 32 | Silver Alloy Used in Solid Electrolyte Type Fuel Cell 11 of the Invention: Remainder | 94 | 505 |
| | 26 CaO: 21 | Silver Alloy Used in Solid Electrolyte Type Fuel Cell 12 of the Invention: Remainder | 93 | 538 |
| | 27 SiO$_2$: 8 | Silver Alloy Used in Solid Electrolyte Type Fuel Cell 13 of the Invention: Remainder | 93 | 550 |
| | 28 TiO$_2$: 13 | Silver Alloy Used in Solid Electrolyte Type Fuel Cell 14 of the Invention: Remainder | 91 | 561 |
| | 29 Fe$_2$O$_3$: 7 | Silver Alloy Used in Solid Electrolyte Type Fuel Cell 15 of the Invention: Remainder | 93 | 559 |
| | 30 NiO: 15 | Silver Alloy Used in Solid Electrolyte Type Fuel Cell 16 of the Invention: Remainder | 94 | 571 |
| | 31 MgO: 32 | Silver Alloy Used in Solid Electrolyte Type Fuel Cell 17 of the Invention: Remainder | 94 | 526 |
| | 32 CaO: 21 | Silver Alloy Used in Solid Electrolyte Type Fuel Cell 18 of the Invention: Remainder | 92 | 543 |
| | 33 SiO$_2$: 8 | Silver Alloy Used in Solid Electrolyte Type Fuel Cell 19 of the Invention: Remainder | 93 | 574 |
| | 34 TiO$_2$: 13 | Silver Alloy Used in Solid Electrolyte Type Fuel Cell 20 of the Invention: Remainder | 91 | 572 |

From the results shown in Table 6, it is understood that the solid electrolyte type fuel cells 21 to 34 of the invention incorporating the air electrode current collectors made of the dispersion strengthened silver alloy porous bodies are greatly improved in the current density at 0.7 V as compared with the cated. By using these air electrode current collectors, similarly to the example 13, solid electrolyte type fuel cells 35 to 39 of the invention having the structure shown in FIG. 2 were fabricated, and with respect to the solid electrolyte type fuel cells 35 to 39 of the invention, current density at 0.7 V was measured, and the results were shown in Table 7.

TABLE 7

| Type | | Kind of Alloy Powder Having High Temperature Strength More Superior Than Silver | Sintering Temperature (° C.) | Air Current Collector Made of Alloy Porous Body Having High Temperature Strength More Superior Than Silver | | | Current Density (mA/cm$^2$) at 0.7 V |
|---|---|---|---|---|---|---|---|
| | | | | Porosity (%) | Thickness of Ni Plating Under Layer (μm) | Thickness of Ag Plating Layer (μm) | |
| Solid Electrolyte Type Fuel Cell of the Invention | 35 | SUS430 | 1100 | 94 | 3 | 10 | 600 |
| | 36 | SUS304 | 1100 | 91 | 3 | 5 | 554 |
| | 37 | Ni-10% Cr | 1100 | 92 | 3 | 5 | 574 |
| | 38 | INCONEL 600 | 1100 | 94 | 3 | 5 | 560 |
| | 39 | Haynes Alloy 188 | 1100 | 94 | 3 | 5 | 571 |

From the results shown in FIG. 7, it is understood that the solid electrolyte type fuel cells 35 to 39 of the invention incorporating the air electrode current collectors in which Ni plating and Ag plating are given to at least the one sides of the porous bodies of the alloys having the high temperature strength more superior than the silver are greatly improved in the current density at 0.7 V as compared with the conventional solid electrolyte type fuel cell 1 of Table 3 fabricated in the conventional example 1.

Example 19

A pure silver fiber made of pure silver and having a mean thickness of 30 μm and a mean length of 2 mm, and a pure silver powder having a mean particle diameter of 2 μm were prepared and combined to have 90% by mass of pure silver fiber and 10% by mass of pure silver power, and they were mixed to fabricate a mixture powder of the pure silver fiber and the pure silver powder. This mixture powder was filled into a metal mold and was slightly subjected to press molding, and then, it was fired at 910° C. for 10 minutes, so that a pure silver felt having a void ratio of 80% and a thickness of 0.7 mm was fabricated, and this pure silver felt was used to fabricate an air electrode current collector made of the pure silver felt.

Similarly to the example 13 except that the air electrode current collector made of the pure silver felt fabricated in the above was used instead of the pure silver porous body in the example 13, a solid electrolyte type fuel cell 40 of the invention having the laminated structure shown in FIG. 2 was fabricated using a solid electrolyte layer, a fuel electrode layer, an air electrode layer, a fuel electrode current collector, and separators.

While the solid electrolyte type fuel cell 40 of the invention obtained in this way was kept at a temperature of 700° C., a dry hydrogen gas as a fuel as was made to flow, and air as an oxidizing agent gas was made to flow, and with respect to the solid electrolyte type fuel cell 40 of the invention, current density at 0.7 V was measured and the result was shown in Table 8.

Incidentally, for comparison, a measurement value of the current density at 0.7 V with respect to the conventional solid electrolyte type fuel cell 1 fabricated in the conventional example 1 is also shown in Table 8.

Example 20

A pure silver thin wire made of pure silver and having a mean thickness of 20 μm was prepared. A pure silver mesh was fabricated by using this pure silver thin wire, and an air electrode current collector made of this pure silver mesh was fabricated. By stacking the air electrode current collector made of this pure silver mesh was stacked at an air electrode side of a cell, a solid electrolyte type fuel cell 41 of the invention having the structure shown in FIG. 2 was fabricated similarly to the example 19. With respect to the solid electrolyte type fuel cell 41 of the invention, current density at 0.7 V was measured and the result was shown in Table 8.

Example 21

A Ni fiber having a mean thickness of 20 μm and a mean length of 3 mm was prepared. The surface of this Ni fiber was plated with pure silver so that a pure silver plated fiber was fabricated, and this pure silver plated fiber was filled into a metal mold, and after press molding was slightly performed, it was fired at 900° C. for 10 minutes, so that a pure silver plated felt having a void ratio of 82% and a thickness 0.7 mm was fabricated, and this pure silver plated felt was used to fabricate an air electrode current collector made of the pure silver plated felt. The air electrode current collector made of this pure silver plated felt was stacked at an air electrode side of a cell, so that a solid electrolyte type fuel cell 42 of the invention having the structure shown in FIG. 2 was fabricated similarly to the example 19, and with respect to the solid electrolyte type fuel cell 42 of the invention, current density at 0.7 V was measured and the result was shown in Table 8.

Example 22

A pure Ni thin wire made of pure Ni and having a mean thickness of 30 μm was prepared. The surface of a Ni mesh fabricated by this Ni thin wire was plated with pure silver to fabricate a pure silver plated mesh, and an air electrode current collector made of this pure silver plated mesh was fabricated. By stacking the air electrode current collector made of this pure silver plated mesh at an air electrode side of a cell, a solid electrolyte type fuel cell 43 of the invention having the structure shown in FIG. 2 was fabricated similarly to the example 19, and with respect to the solid electrolyte type fuel cell 43 of the invention, current density at 0.7 V was measured and the result was shown in Table 8.

TABLE 8

| Type | Structure of Air Electrode Current Collector Incorporated in Solid Electrolyte Type Fuel Cell | Current Density (mA/cm$^2$) at 0.7 V |
|---|---|---|
| Solid Electrolyte Type Fuel Cell 40 of the Invention | Pure Silver Felt Made of Pure Silver Fiber | 603 |
| Solid Electrolyte Type Fuel | Pure Silver Mesh Made of | 591 |

TABLE 8-continued

| Type | Structure of Air Electrode Current Collector Incorporated in Solid Electrolyte Type Fuel Cell | Current Density (mA/cm²) at 0.7 V |
|---|---|---|
| Cell 41 of the Invention Solid Electrolyte Type Fuel Cell 42 of the Invention | Pure Silver Thin Wire Pure Silver Plated Felt Made of Pure Silver Plated Fiber in Which Surface of Ni Fiber Is Plated with Pure Silver | 576 |
| Solid Electrolyte Type Fuel Cell 43 of the Invention | Pure Silver Plated Mesh in Which Surface of Ni Mesh Made of Ni Thin Wire Is Plated with Pure Silver | 560 |
| Conventional Solid Electrolyte Type Fuel Cell 1 | Platinum Mesh | 360 |

From the results shown in Table 8, it is understood that all of the solid electrolyte type fuel cell 40 of the invention incorporating the air electrode current collector made of the pure silver felt, the solid electrolyte type fuel cell 41 of the invention incorporating the air electrode current collector made of the pure silver mesh, the solid electrolyte type fuel cell 42 of the invention incorporating the air electrode current collector made of the pure silver plated felt, and the solid electrolyte type fuel cell 43 of the invention incorporating the air electrode current collector made of the pure silver plated mesh are greatly improved in current density at 0.7 V as compared with the conventional solid electrolyte type fuel cell 1 incorporating the air electrode current collector fabricated in the conventional example 1 and made of the platinum mesh.

INDUSTRIAL APPLICABILITY

As described above, according to the solid electrolyte type fuel cell of the invention, since the metal separator in which the metal matrix other than the silver or the silver alloy is plated with one of silver and silver alloy is used, the electric resistance can be remarkably decreased for a long time. Besides, as the air electrode current collector, the porous body made of silver or silver alloy, or the porous body in which the metal matrix other than the silver or the silver alloy is coated with silver or silver alloy is used, so that oxygen is dissolved in the inside of silver, and oxygen easily diffuses the inside. As a result, even in the case where it is operated at a low temperature, the electric resistance of the metal separator is not increased, and the electric power generation efficiency can be improved.

Further, since the air electrode current collector of the invention is constituted by the silver porous body, the silver porous body in which the oxide film is formed on the surface of the silver porous body, the dispersion strengthened silver porous body, the silver alloy porous body having the melting point of 600° C. or higher, the porous body in which Ni plating or Ag plating is given to at least one side of the porous body of the alloy having high temperature strength more superior than silver, the silver felt, the silver mesh, the silver plated felt, or the silver plated mesh, the solid electrolyte type fuel cell incorporating the air electrode current collector can improve the electric power generation efficiency by a factor of 1.6 or more as compared with the conventional solid electrolyte type fuel cell incorporating the air electrode current collector made of the platinum mesh. As a result, superior electric power generation characteristics are obtained even when the operation is performed at a temperature lowered to 900° C. or lower, and since the operation can be performed at a low temperature, the use life can be prolonged, and further, since the low cost material can be used, the manufacture cost can be reduced, and great contribution to the development of the fuel cell industry is obtained.

What is claimed is:

1. A solid type electrolyte fuel cell comprising: an electric power generation cell made up of a solid electrolyte layer, a fuel electrode layer and an air electrode layer; a fuel electrode current collector disposed to be in close contact with the fuel electrode layer; and an air electrode current collector disposed to be in close contact with the air electrode layer, wherein the air electrode current collector comprises a silver porous body, wherein the silver porous body is a sponge metal porous body having a skeletal structure, wherein a porosity of the silver porous body is within a range from 60% to 97%, wherein the porous body is reinforced by a mesh metal body, wherein the mesh metal body is made of silver or silver alloy, or a metal matrix which is other than silver or silver alloy and is coated with silver or silver alloy, and wherein the mesh metal body is the metal matrix other than the silver or the silver alloy, the metal matrix is plated with nickel, and is plated with silver while the nickel plating is used as an under layer.

2. A solid electrolyte type fuel cell according to claim 1, wherein the porous body is a sponge metal porous body having a three-dimensional skeletal structure.

* * * * *